United States Patent
Fall (10) Patent No.: US 10,009,445 B2
(45) Date of Patent: Jun. 26, 2018

(54) AVOIDING UNWANTED TCP RETRANSMISSIONS USING OPTIMISTIC WINDOW ADJUSTMENTS

(71) Applicant: Qualcomm Incorporated, San Diego, CA (US)

(72) Inventor: Kevin Roland Fall, Bethel, PA (US)

(73) Assignee: QUALCOMM Incorporated, San Diego, CA (US)

( * ) Notice: Subject to any disclaimer, the term of this patent is extended or adjusted under 35 U.S.C. 154(b) by 584 days.

(21) Appl. No.: 13/830,048

(22) Filed: Mar. 14, 2013

(65) Prior Publication Data

US 2013/0339543 A1 Dec. 19, 2013

Related U.S. Application Data

(60) Provisional application No. 61/659,950, filed on Jun. 14, 2012.

(51) Int. Cl.
*G06F 15/173* (2006.01)
*H04L 29/06* (2006.01)
(Continued)

(52) U.S. Cl.
CPC ............ *H04L 69/16* (2013.01); *H04L 1/1825* (2013.01); *H04L 1/1832* (2013.01); *H04L 1/1838* (2013.01)

(58) Field of Classification Search
CPC ............................ H04L 69/16; H04L 1/1832
(Continued)

(56) References Cited

U.S. PATENT DOCUMENTS 5,754,754 A 5/1998 Dudley et al.
6,493,316 B1 12/2002 Chapman et al.
(Continued)

FOREIGN PATENT DOCUMENTS

CN 1819553 A 8/2006
CN 1894894 A 1/2007
(Continued)

OTHER PUBLICATIONS

Cai, L., et al., "A QoS-aware AIMD protocol for time-sensitive applications in wired/wireless networks", INFOCOM 2005. 24th Annual Joint Conference of the IEEE Computer and Co Mmunications Societies. Proceedings IEEE Miami, USA Mar. 13-17, 2005, Piscataway, NJ, USA, vol. 3, Mar. 13, 2005 (Mar. 13, 2005), pp. 2008-2019, DOI: 10.1109/INFCOM.2005.1498478, ISBN: 978-0-7803-8968-7.

(Continued)

*Primary Examiner* — Kevin Bates
*Assistant Examiner* — Mark A Scott
(74) *Attorney, Agent, or Firm* — The Marbury Law Group (57) ABSTRACT

A method, an apparatus, and a computer program product for communicating data via the Transmission Control Protocol (TCP) are provided. The apparatus receives from a sender a plurality of data segments according to a sequential order, infers at least one missing data segment in the sequential order, and acknowledges to the sender receipt of a highest byte sequence number of a received data segment plus one based on the inference of the at least one missing data segment. The apparatus also adjusts a receive window based on at least one of: the inference of the at least one missing data segment, or a round-trip-time of a TCP connection, wherein the receive window indicates a buffer (Continued)

capacity for receiving data segments. The apparatus further advertises the adjusted receive window to the sender.

34 Claims, 6 Drawing Sheets (51) Int. Cl.
  *H04L 12/24* (2006.01)
  *H04L 12/56* (2006.01)
  *G06F 15/16* (2006.01)
  *H04L 12/26* (2006.01)
  *H04L 1/18* (2006.01)

(58) Field of Classification Search
  USPC .......................................................... 709/233
  See application file for complete search history.

(56) References Cited

U.S. PATENT DOCUMENTS

| | | | |
|---|---|---|---|
| 6,728,247 B1* | 4/2004 | Meyer et al. ................. | 370/394 |
| 7,813,324 B1* | 10/2010 | Goel ....................... | H04L 1/004 |
| | | | 370/336 |
| 7,899,925 B2 | 3/2011 | Ghose et al. | |
| 8,194,675 B2 | 6/2012 | Tavares et al. | |
| 8,761,181 B1* | 6/2014 | Gostev ................. | H04L 1/1614 |
| | | | 370/393 |
| 8,819,512 B1* | 8/2014 | Wang ........................ | H04L 1/08 |
| | | | 714/748 |
| 9,026,597 B1* | 5/2015 | Emigh ................. | H04L 1/1635 |
| | | | 370/254 |
| 2004/0192312 A1* | 9/2004 | Li ............................ | H04L 1/16 |
| | | | 455/445 |
| 2005/0036511 A1* | 2/2005 | Baratakke et al. ........... | 370/469 |
| 2005/0058131 A1* | 3/2005 | Samuels ................. | H04L 12/24 |
| | | | 370/389 |
| 2005/0060574 A1* | 3/2005 | Klotz ....................... | H04L 41/22 |
| | | | 726/4 |
| 2005/0063302 A1* | 3/2005 | Samuels ................. | H04L 41/00 |
| | | | 370/229 |
| 2005/0180327 A1* | 8/2005 | Banerjee ................. | H04L 47/10 |
| | | | 370/236 |
| 2005/0223089 A1* | 10/2005 | Rhodes ............... | H04L 43/0876 |
| | | | 709/223 |
| 2006/0034286 A1* | 2/2006 | Koning ................. | H04L 69/163 |
| | | | 370/394 |
| 2006/0045011 A1* | 3/2006 | Aghvami ................ | H04L 47/10 |
| | | | 370/230 |
| 2006/0133379 A1* | 6/2006 | Krishnan ................... | H04L 1/16 |
| | | | 370/394 |
| 2006/0193261 A1* | 8/2006 | Sethi ....................... | H04L 47/10 |
| | | | 370/236 |
| 2006/0262738 A1* | 11/2006 | Fernandes et al. .......... | 370/282 |
| 2007/0064705 A1* | 3/2007 | Tateno ................. | H04L 1/1614 |
| | | | 370/394 |
| 2007/0070916 A1* | 3/2007 | Lehane et al. ................ | 370/252 |
| 2007/0097987 A1* | 5/2007 | Rey ....................... | H04L 65/608 |
| | | | 370/395.52 |
| 2008/0177884 A1* | 7/2008 | Agarwal ....................... | 709/227 |
| 2008/0259926 A1* | 10/2008 | Tavares et al. ................ | 370/394 |
| 2008/0291911 A1* | 11/2008 | Lee et al. ....................... | 370/389 |
| 2009/0154356 A1* | 6/2009 | Wiemann ............... | H04L 1/1809 |
| | | | 370/236 |
| 2010/0020689 A1* | 1/2010 | Tang ....................... | H04L 47/10 |
| | | | 370/235 |
| 2010/0046370 A1* | 2/2010 | Ghose ................... | H04L 1/1809 |
| | | | 370/235 |
| 2010/0046520 A1* | 2/2010 | Nakata ................. | H04L 1/1867 |
| | | | 370/394 |
| 2010/0094959 A1* | 4/2010 | Zuckerman ......... | H04L 67/1097 |
| | | | 709/219 |
| 2010/0177701 A1* | 7/2010 | Maheshwari ......... | H04L 1/1685 |
| | | | 370/328 |
| 2010/0232294 A1* | 9/2010 | Samuels ................. | H04L 12/24 |
| | | | 370/235 |
| 2010/0232437 A1* | 9/2010 | Bajpai et al. ................. | 370/400 |
| 2010/0274848 A1* | 10/2010 | Altmaier ............... | H04L 67/104 |
| | | | 709/203 |
| 2011/0058497 A1* | 3/2011 | Lindskog ............... | H04L 1/1832 |
| | | | 370/252 |
| 2011/0078285 A1* | 3/2011 | Hawkins ............. | G06F 17/3089 |
| | | | 709/219 |
| 2011/0096662 A1* | 4/2011 | Gerber ................... | H04L 47/365 |
| | | | 370/230 |
| 2011/0110230 A1* | 5/2011 | Zhuang ................ | H04L 1/1867 |
| | | | 370/230 |
| 2011/0185068 A1* | 7/2011 | Schmieder ............. | H04L 69/16 |
| | | | 709/227 |
| 2011/0228697 A1* | 9/2011 | Yano et al. ..................... | 370/253 |
| 2012/0120805 A1* | 5/2012 | Maze .................... | H04L 1/1835 |
| | | | 370/235 |
| 2012/0134362 A1 | 5/2012 | Itagaki et al. | |
| 2012/0143993 A1* | 6/2012 | Russo et al. ................... | 709/219 |
| 2012/0227088 A1* | 9/2012 | Gao ....................... | H04L 63/126 |
| | | | 726/3 |
| 2012/0278477 A1* | 11/2012 | Terrell ................ | H04L 41/5009 |
| | | | 709/224 |
| 2012/0320752 A1* | 12/2012 | Gouache ................ | H04L 45/24 |
| | | | 370/237 |
| 2012/0320916 A1* | 12/2012 | Sebastian ...................... | 370/390 |
| 2013/0028121 A1* | 1/2013 | Rajapakse ........... | H04L 65/4076 |
| | | | 370/252 |
| 2013/0044595 A1* | 2/2013 | Han ................... | H04W 28/0242 |
| | | | 370/230 |
| 2014/0192639 A1* | 7/2014 | Smirnov ................. | H04L 47/10 |
| | | | 370/230 |
| 2015/0215359 A1* | 7/2015 | Bao ....................... | H04L 65/605 |
| | | | 709/219 |

FOREIGN PATENT DOCUMENTS

| | | |
|---|---|---|
| CN | 101369875 A | 2/2009 |
| WO | WO-2010118255 A2 | 10/2010 |

OTHER PUBLICATIONS

International Search Report and Written Opinion—PCT/US2013/045516—ISA/EPO—Oct. 30, 2013.

* cited by examiner

AVOIDING UNWANTED TCP RETRANSMISSIONS USING OPTIMISTIC WINDOW ADJUSTMENTS

CROSS-REFERENCE TO RELATED APPLICATION(S)

This application claims the benefit of U.S. Provisional Application Ser. No. 61/659,950, entitled "AVOIDING UNWANTED TCP RETRANSMISSIONS USING OPTIMISTIC WINDOW ADJUSTMENTS" and filed on Jun. 14, 2012, which is expressly incorporated by reference herein in its entirety.

BACKGROUND

Field

The present disclosure relates generally to communication systems, and more particularly, to adjusting a receive window and acknowledgment to mitigate unwanted data segment retransmissions sent via the Transmission Control Protocol (TCP).

Background

The Transmission Control Protocol (TCP) is a reliable data transport protocol widely used across communications networks. TCP provides a robust congestion control algorithm to share bandwidth between current TCP sessions. The congestion control algorithm avoids problems related to network congestion by automatically scaling back a data transfer to match an available bandwidth capacity. Multiple concurrent and reliable data transfers across a shared network link may result in high congestion if each of the data transfer sessions tries to fully utilize the link capacity. The high congestion may result in high packet loss, which in turn may cause a large number of packet retransmissions, ultimately resulting in network collapse. TCP's congestion control algorithm avoids this problem by automatically determining how much bandwidth is available and sharing the total available bandwidth equally with other concurrent TCP sessions.

TCP utilizes various internal algorithms to provide congestion control capability. These algorithms include flow control, slow start, packet reordering, packet loss detection, retransmission timers, and numerous other mechanisms to dynamically decrease or increase the data transmission rate based on network conditions.

TCP's flow control algorithm is a mechanism to prevent a receiver from receiving more data than the receiver is capable of processing or buffering. For example, if a receiving TCP stack has a buffer to store 16 kilobytes of data, a sender is not allowed to transmit more than 16 kilobytes of data at any time to the receiver. The receiver continuously sends back acknowledgments to the sender throughout the data transfer stating how much additional data the receiver can accept. This additional data that the receiver can accept is known as the "window indication" (or "window advertisement") and is included as a field in a TCP header.

SUMMARY

Transmission Control Protocol (TCP) may be problematic for a live audio or video application, for example. Under TCP, when data portions are delivered from a sender to a receiver, any missing data portions at the receiver must be retransmitted by the sender and received by the receiver so that only data with no missing portions are delivered to the application. When TCP is used for streaming applications (e.g., audio or video), the loss of data can cause unwanted delay at the receiving application while the protocol implementation waits for the missing data portions to be filled. This can lead to undesired behavior (e.g., skips, stalls) when playing back continuous media. Accordingly, the present disclosure allows data portions arriving out of order at the receiver to be delivered immediately to the application and prevents the sender from retransmitting unnecessary older portions.

In an aspect, a method, an apparatus, and a computer program product for communicating data via the Transmission Control Protocol (TCP) are provided. The apparatus receives from a sender a plurality of data segments according to a sequential order, infers at least one missing data segment in the sequential order, and acknowledges to the sender receipt of a highest byte sequence number of a received data segment plus one based on the inference of the at least one missing data segment.

In a further aspect, the apparatus transmits to a receiver a plurality of data segments according to a sequential order, receives at a sender acknowledgement from the receiver acknowledging receipt of a highest sequence number of a data segment plus one received at the receiver, receives an advertised receive window from the receiver, the advertised receive window indicating a buffer capacity for receiving data packets at the receiver, and sends at least one additional data packet to the receiver at an adjusted transmission rate based on the advertised receive window.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Transmission Control Protocol (TCP) is a widely used transport protocol. TCP may be used by Internet applications, for example. TCP is optimized for accurate data delivery, wherein the data is divided into segments (packets) and the segments are delivered to an application in order according to the protocol. During delivery from a sender to a receiver, the segments may potentially be lost. If lost, the sender of the segments does not know of the lost segments until the receiver informs (or induces to inform) the sender. Because of the abstraction TCP implements, the receiver delivers data, which is numbered using a per-byte sequence number, to a receiving application up to the largest in-order sequence number, irrespective of the actual packet receive order.

For example, the sender may send segments 1, 2, 3, 4, 5, and 6 to the receiver. However, during delivery, segment 3 is lost, but segments 1, 2, 4, 5, and 6 are successfully received at the receiver. Accordingly, under TCP, the receiver cannot deliver the data from segments 4, 5, and 6 to the receiving application until segment 3 is re-transmitted from the sender and successfully received at the receiver.

In more detail, each time the sender sends a segment subsequent to segment 3 that the receiver receives (e.g., segments 4, 5, and 6), the receiver will acknowledge the largest or latest-received byte sequence number contained in the segment received in order, e.g., the receiver will acknowledge (ACK) receipt of a largest sequence number contained in segment 2 (plus one) when segment 4 is received, and again when segments 5 and 6 are received. Accordingly, based on the repeated acknowledgment of segment 2, the sender will infer that segment 3 was not received at the receiver since the sender has received extra notifications of the receipt of segment 2. The extra notifications may also suggest to the sender that segments ordered sequentially after segment 3 were successfully received at the receiver although segment 3 may have been lost.

When the sender realizes that the receiver is missing segment 3, the sender will re-transmit segment 3 to the receiver using a procedure called "fast retransmit". When the segment 3 arrives at the receiver, segments 3, 4, 5, and 6 will be in contiguous order, and therefore, the TCP allows the receiver to deliver all data from segments 3, 4, 5, and 6 to the receiving application. Moreover, the receiver may acknowledge receipt of the bytes from segment 6 to the sender, which would now be the largest or latest-received segment received in order. When the acknowledgment of the data for segment 6 is received by the sender, the sender may infer that the receiver is ready to receive a next sequential segment (e.g., segment 7), and may transmit accordingly.

Currently, TCP may be problematic in certain circumstances, such as for a live audio or video event, for example. When a segment goes missing during delivery from the sender to the receiver, the delay in waiting to receive the missing segment at the receiver may be unnecessary or undesired. This is because the receiving application is unable to receive segments subsequently received at the receiver (or ordered sequentially after the missing segment) until the missing segment is re-transmitted by the sender and successfully received at the receiver.

In streaming video systems, TCP may be used as the transport protocol due to its ability to penetrate firewalls or other reasons. TCP provides an in-order delivery abstraction to a receiving application. As a consequence, any data "missing" at the receiver (of a two-party conversation) must be filled in by the sender so that only data with no missing portions are delivered to applications. When TCP is used for streaming applications (e.g., audio or video), the loss of data can cause unwanted delay at the receiving application while the protocol implementation waits for data "holes" to be filled. This can lead to undesired behavior (e.g., skips, stalls) when playing back continuous media. Accordingly, a change in interface is needed that allows out of order delivery to occur. In an aspect, the protocol may allow the receiver to "lie" and indicate to the sender that data has been received even when the receiver has not. For example, the receiver may provide acknowledgments for newly-arriving segments (packets) even if there are past "holes" at the receiver.

The present disclosure provides to couple application programming interface (API) changes permitting out of order segment (packet) delivery, ACK synthesis (e.g., "lying" to the sender), and adjustment to a TCP receiver's advertised window to effect congestion control. This approach allows information arriving out of order at the receiver to be delivered immediately to the application and prevents the sender from retransmitting unnecessary older segments (packets). In an aspect, "lying" to the sender by itself may cause the sender to not perform important congestion control procedures. Therefore, the disclosure also provides for adjusting the receiver's advertised window to cause the sender to correct to an appropriate sending rate even when the sender is "lied" to about data being received at the receiver when the receiver has not received such data.

Figure 1:
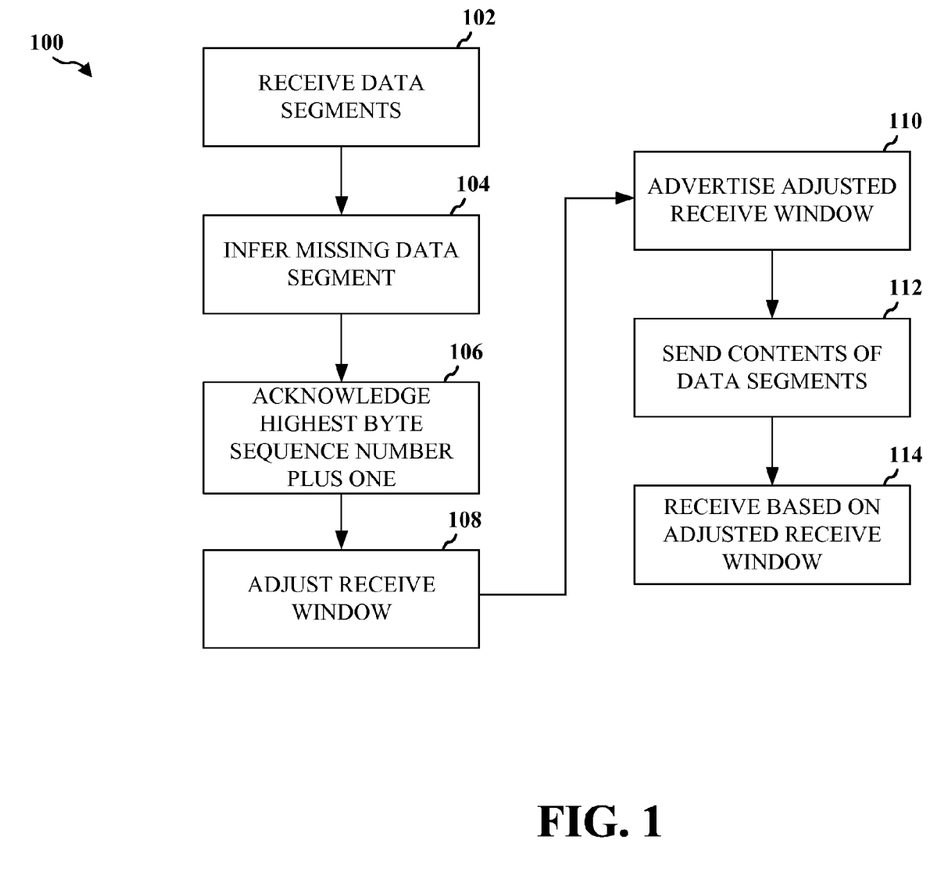
FIG. 1 is a flow chart of a method of communicating data.

FIG. 1 is a flow chart 100 of a method of communicating data via Transmission Control Protocol (TCP). The method may be performed by a receiver (e.g., mobile host computer).

At step 102, the receiver receives from a sender a plurality of data segments (packets) according to a sequential order. At step 104, the receiver infers at least one missing data segment in the sequential order.

At step 106, the receiver acknowledges to the sender receipt of a highest byte sequence number of a received data segment plus one. The acknowledgment may be based on the inference of the at least one missing data segment. The acknowledgment may be further based on knowledge of missing byte sequence numbers in the sequential order, wherein the missing byte sequence numbers correspond to missing data segments. The highest byte sequence number plus one may correspond to a latest received data segment ordered sequentially before the at least one missing data packet. Alternatively, the highest byte sequence number plus one may correspond to a latest received data packet ordered sequentially after the at least one missing data packet.

In an aspect, each of the received plurality of data segments have a byte sequence number, and the at least one missing data segment corresponds to at least one missing byte sequence number in the sequential order. Accordingly, the highest byte sequence number plus one corresponding to the latest received data packet may be greater than the at least one missing byte sequence number.

At step 108, the receiver may adjust a receive window. The adjustment of the receive window may be based on at least one of the inference of the at least one missing data segment, or a round-trip-time of a TCP connection. The receive window may indicate a buffer capacity for receiving data segments. That is, the receive window may indicate a number of additional data bytes the receiver is willing to receive.

At step 110, the receiver advertises the adjusted receive window to the sender. At step 112, the receiver may send the contents of data segments received at any arbitrary time to an application without waiting to receive the at least one missing data packet. Thereafter, at step 114, the receiver may receive at least one additional data segment from the sender at an adjusted transmission rate based on the advertised adjusted receive window.

Figure 2:
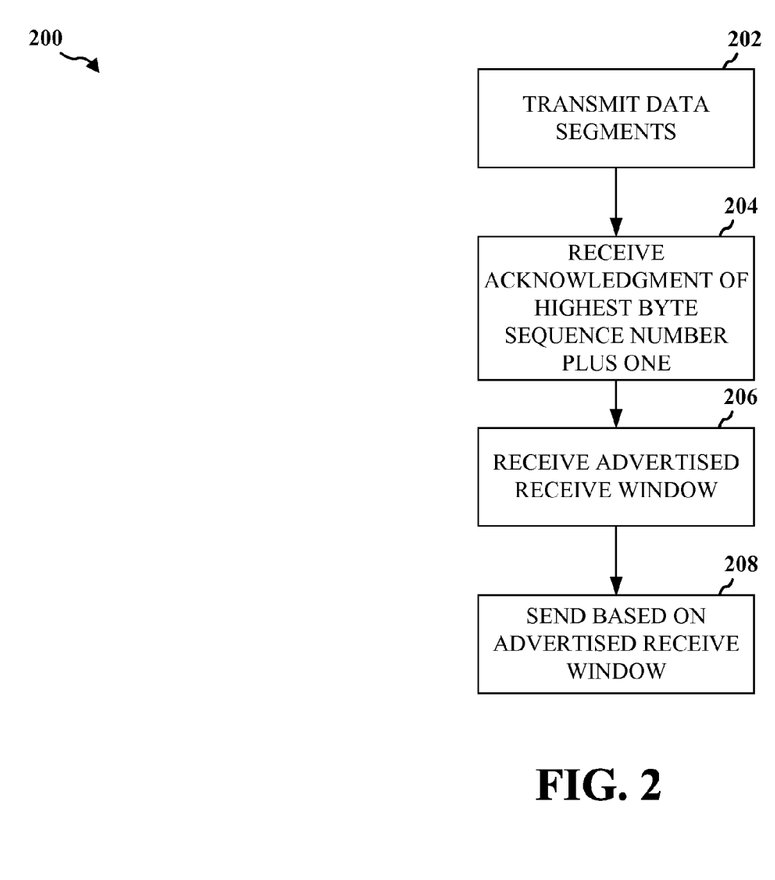
FIG. 2 is a flow chart of a method of communicating data.

FIG. 2 is a flow chart 200 of a method of communicating data via the Transmission Control Protocol (TCP). The method may be performed by a sender (e.g., host computer that is a party of a two-party TCP connection). At step 202, the sender may transmit to a receiver a plurality of data segments (packets) according to a sequential order. At step 204, the sender receives acknowledgement from the receiver acknowledging receipt of a highest sequence number of a data segment plus one. The highest sequence number may be a highest sequence number among all sequence numbers corresponding to data segments stored at the receiver for a same connection.

At step 206, the sender receives an advertised receive window from the receiver. The advertised receive window may indicate a buffer capacity for receiving data segments at the receiver. For example, the advertised receive window may indicate a number of additional data bytes the receiver is willing to receive. Thereafter, at step 208, the sender sends at least one additional data segment to the receiver at an adjusted transmission rate based on the advertised receive window.

Figure 3:
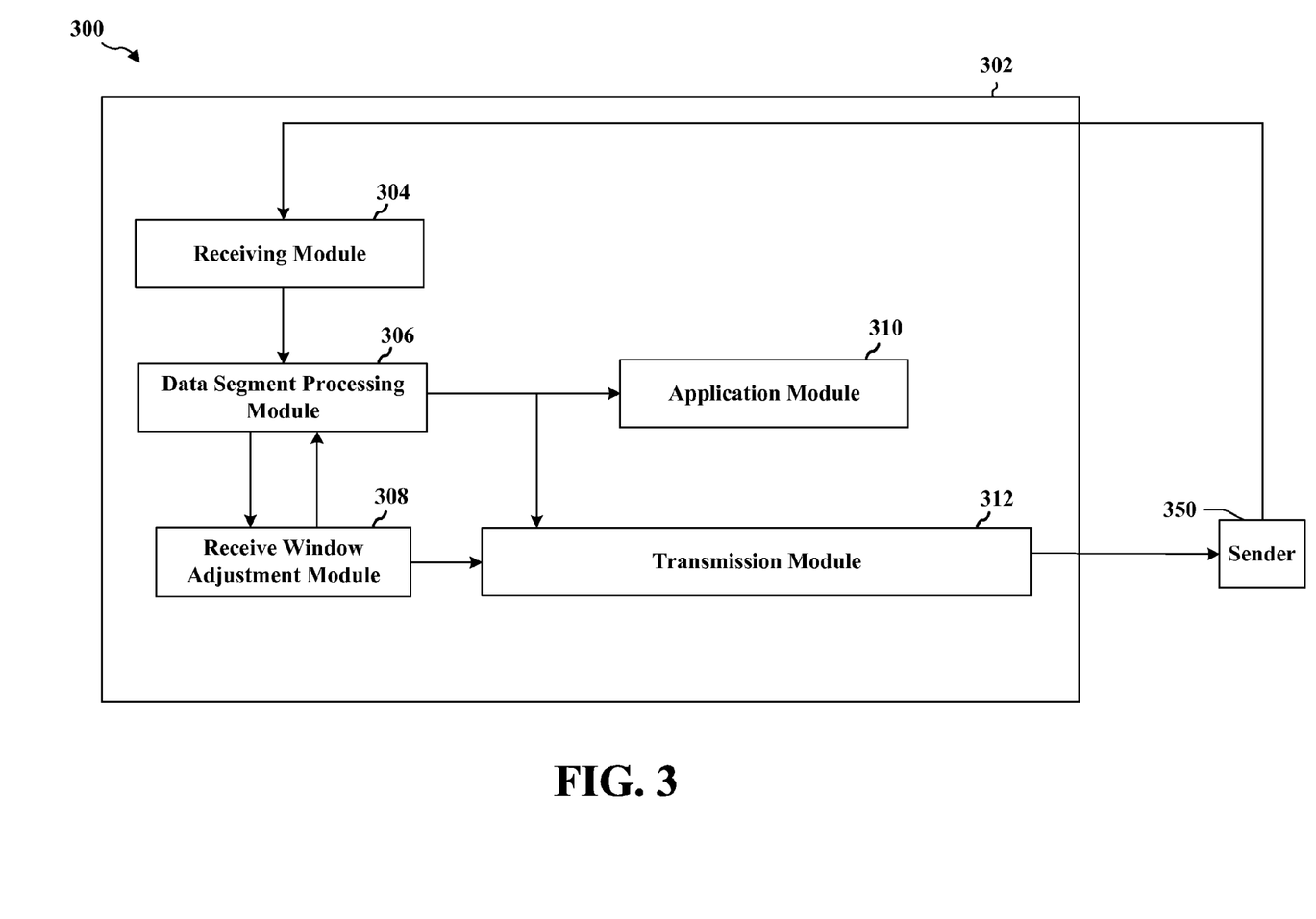
FIG. 3 is a conceptual data flow diagram illustrating the data flow between different modules/means/components in an exemplary apparatus.

FIG. 3 is a conceptual data flow diagram 300 illustrating the data flow between different modules/means/components in an exemplary apparatus 302. The apparatus may be a receiver communicating data via the Transmission Control Protocol (TCP). The apparatus includes a receiving module 304, a data segment processing module 306, a receive window adjustment module 308, an application module 310, and a transmission module 312.

The receiving module 304 receives from a sender (e.g., host computer TCP protocol processing software) 350 a plurality of data segments (packets) according to a sequential order. The data segment processing module 306 infers at least one missing data segment in the sequential order.

The data segment processing module 306 acknowledges to the sender 350 receipt of a highest byte sequence number of a received data segment plus one. The acknowledgment may be based on the inference of the at least one missing data segment. The acknowledgment may be further based on knowledge of missing byte sequence numbers in the sequential order, wherein the missing byte sequence numbers correspond to missing data segments. The highest byte sequence number plus one may correspond to a latest received data segment ordered sequentially before the at least one missing data segment. Alternatively, the highest byte sequence number plus one may correspond to a latest received data segment ordered sequentially after the at least one missing data segment.

In an aspect, each of the received plurality of data segments have a byte sequence number, and the at least one missing data segment corresponds to at least one missing byte sequence number in the sequential order. Accordingly, the highest byte sequence number plus one corresponding to the latest received data packet may be greater than the at least one missing byte sequence number.

The receive window adjustment module 308 may adjust a receive window. The adjustment of the receive window may be based on at least one of the inference of the at least one missing data segment, or a round-trip-time of a TCP connection. The receive window may indicate a buffer capacity for receiving data segments. That is, the receive window may indicate a number of additional data bytes the apparatus 302 is willing to receive.

The receive window adjustment module 308 advertises the adjusted receive window to the sender 350 via the transmission module 312. Moreover, the data segment processing module 306 may send the contents of data packets received at any arbitrary time to the application module 310 without waiting to receive the at least one missing data segment. Thereafter, the data segment processing module 306 may receive at least one additional data segment from the sender 350 at an adjusted transmission rate based on the advertised adjusted receive window.

Figure 4:
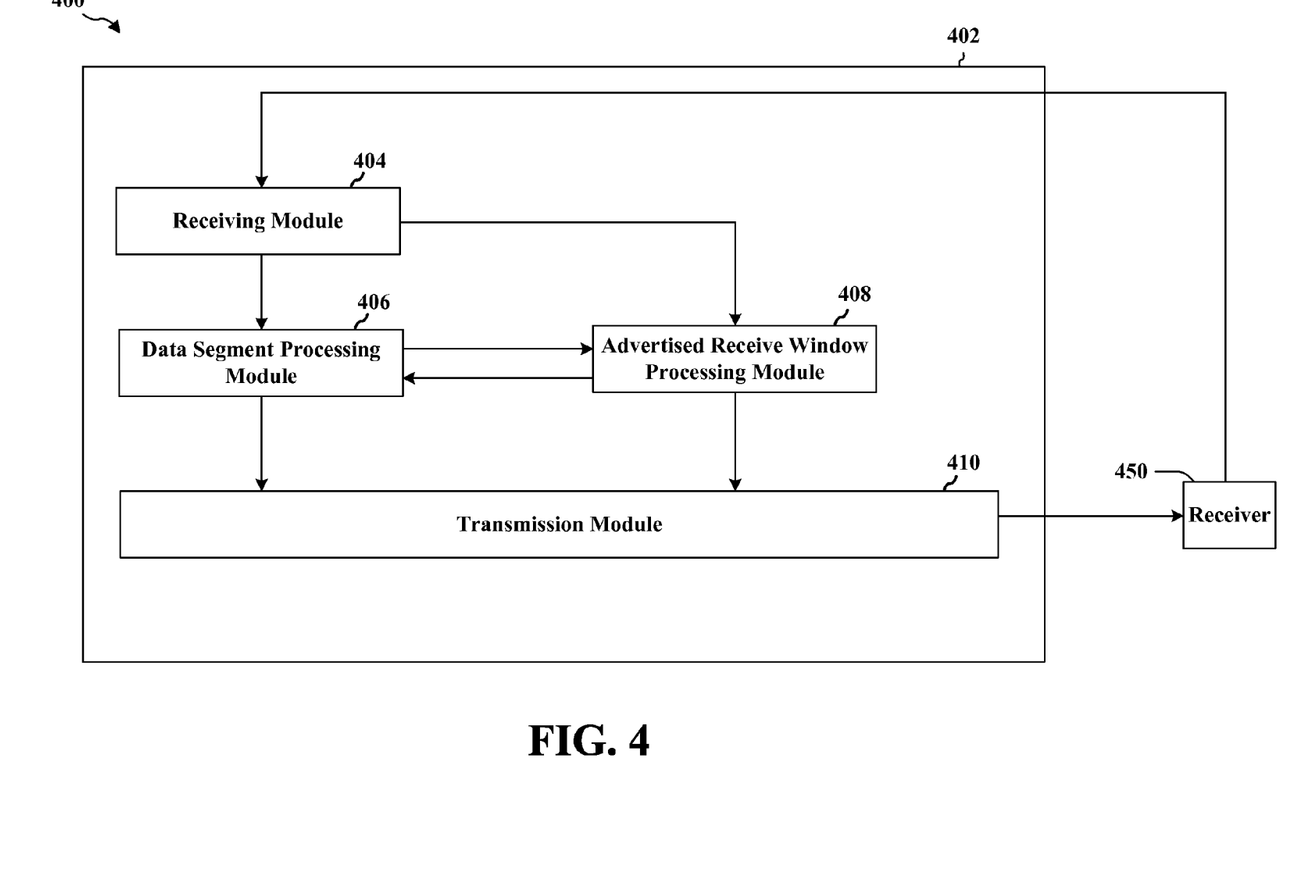
FIG. 4 is a conceptual data flow diagram illustrating the data flow between different modules/means/components in an exemplary apparatus.

FIG. 4 is a conceptual data flow diagram 400 illustrating the data flow between different modules/means/components in an exemplary apparatus 402. The apparatus may be a host computer communicating data via the Transmission Control Protocol (TCP). The apparatus includes a receiving module 404, a data segment processing module 406, an advertised receive window processing module 408, and a transmission module 410.

The data segment processing module 406 may transmit to a receiver (e.g., mobile host computer) 450 a plurality of data segments (packets) according to a sequential order via the transmission module 410. The receiving module 410 receives acknowledgement from the receiver 450 acknowledging receipt of a highest sequence number of a data segment plus one. The highest sequence number may be a highest sequence number among all sequence numbers corresponding to data segments stored at the receiver 450 for a same connection.

The advertised received window processing module 408 receives (via receiving module 404) an advertised receive window from the receiver 450. The advertised receive window may indicate a buffer capacity for receiving data segments at the receiver. For example, the advertised receive window may indicate a number of additional data bytes the receiver is willing to receive. Thereafter, the data segment processing module 406 may send at least one additional data segment to the receiver 450 at an adjusted transmission rate based on the advertised receive window.

The apparatus may include additional modules that perform each of the steps of the algorithm in the aforementioned flow charts of FIGS. 1-2. As such, each step in the aforementioned flow charts of FIGS. 1-2 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 5:
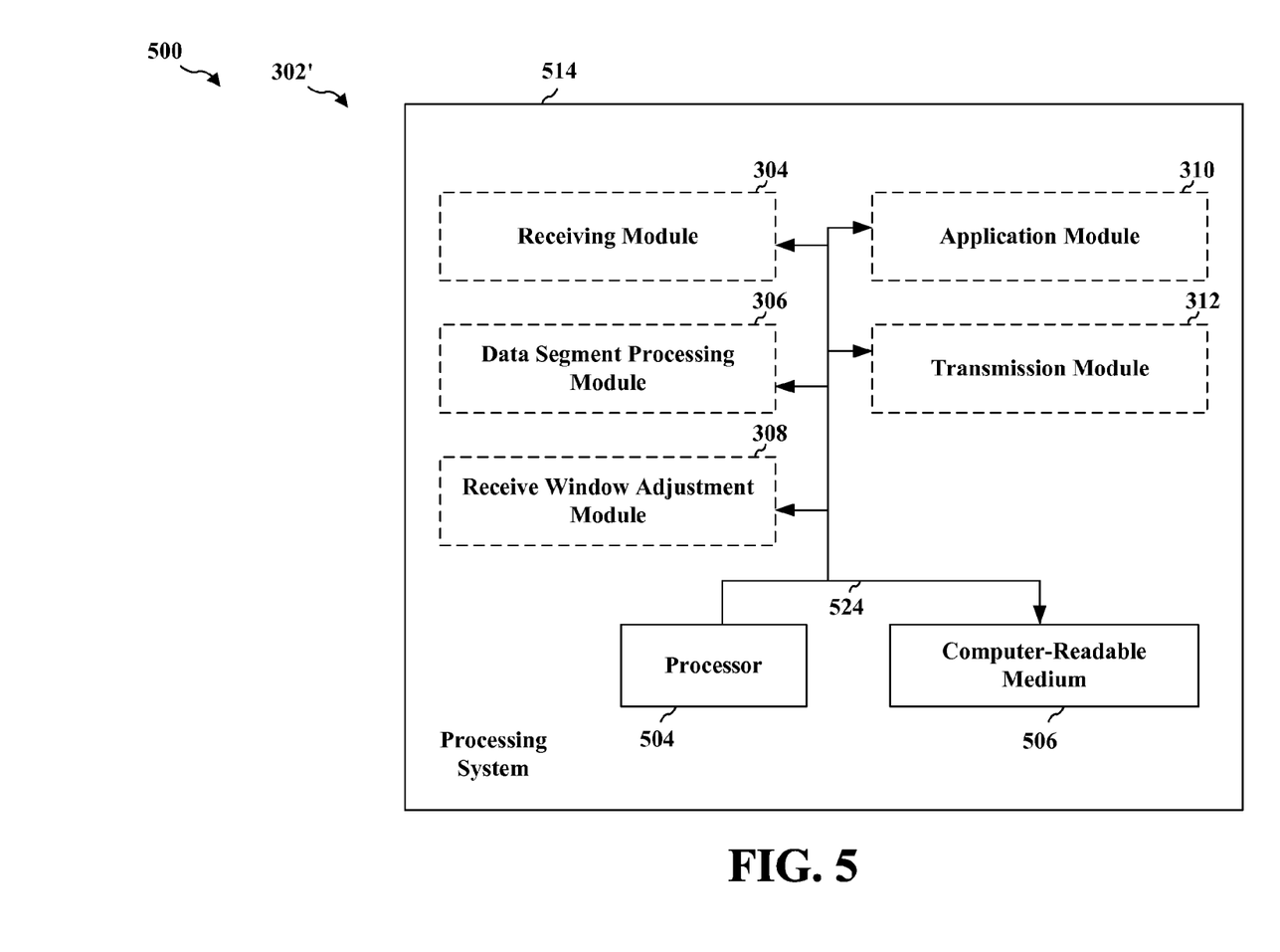
FIG. 5 is a diagram illustrating an example of a hardware implementation for an apparatus employing a processing system.

FIG. 5 is a diagram 500 illustrating an example of a hardware implementation for an apparatus 302' employing a processing system 514. The processing system 514 may be implemented with a bus architecture, represented generally by the bus 524. The bus 524 may include any number of interconnecting buses and bridges depending on the specific application of the processing system 514 and the overall design constraints. The bus 524 links together various circuits including one or more processors and/or hardware modules, represented by the processor 504, the modules 304, 306, 308, 310, 312 and the computer-readable medium 506.

The processing system 514 includes a processor 504 coupled to a computer-readable medium 506. The processor 504 is responsible for general processing, including the execution of software stored on the computer-readable medium 506. The software, when executed by the processor 504, causes the processing system 514 to perform the various functions described supra for any particular apparatus. The computer-readable medium 506 may also be used for storing data that is manipulated by the processor 504 when executing software. The processing system further includes at least one of the modules 304, 306, 308, 310, and 312. The modules may be software modules running in the processor 504, resident/stored in the computer readable medium 506, one or more hardware modules coupled to the processor 504, or some combination thereof.

In one configuration, the apparatus 302/302' for communicating data includes means for receiving from a sender a plurality of data segments according to a sequential order, means for inferring at least one missing data segment in the sequential order, means for acknowledging to the sender receipt of a highest byte sequence number of a received data segment plus one based on the inference of the at least one missing data segment, means for adjusting a receive window based on at least one of: the inference of the at least one missing data segment, or a round-trip-time of a TCP connection, the receive window indicating a buffer capacity for receiving data segments, means for advertising the adjusted receive window to the sender, means for receiving at least one additional data segment from the sender at an adjusted transmission rate based on the advertised adjusted receive window, and means for sending the contents of data segments received at any arbitrary time to an application without waiting to receive the at least one missing data segment. The aforementioned means may be one or more of the aforementioned modules of the apparatus 302 and/or the processing system 514 of the apparatus 302' configured to perform the functions recited by the aforementioned means.

Figure 6:
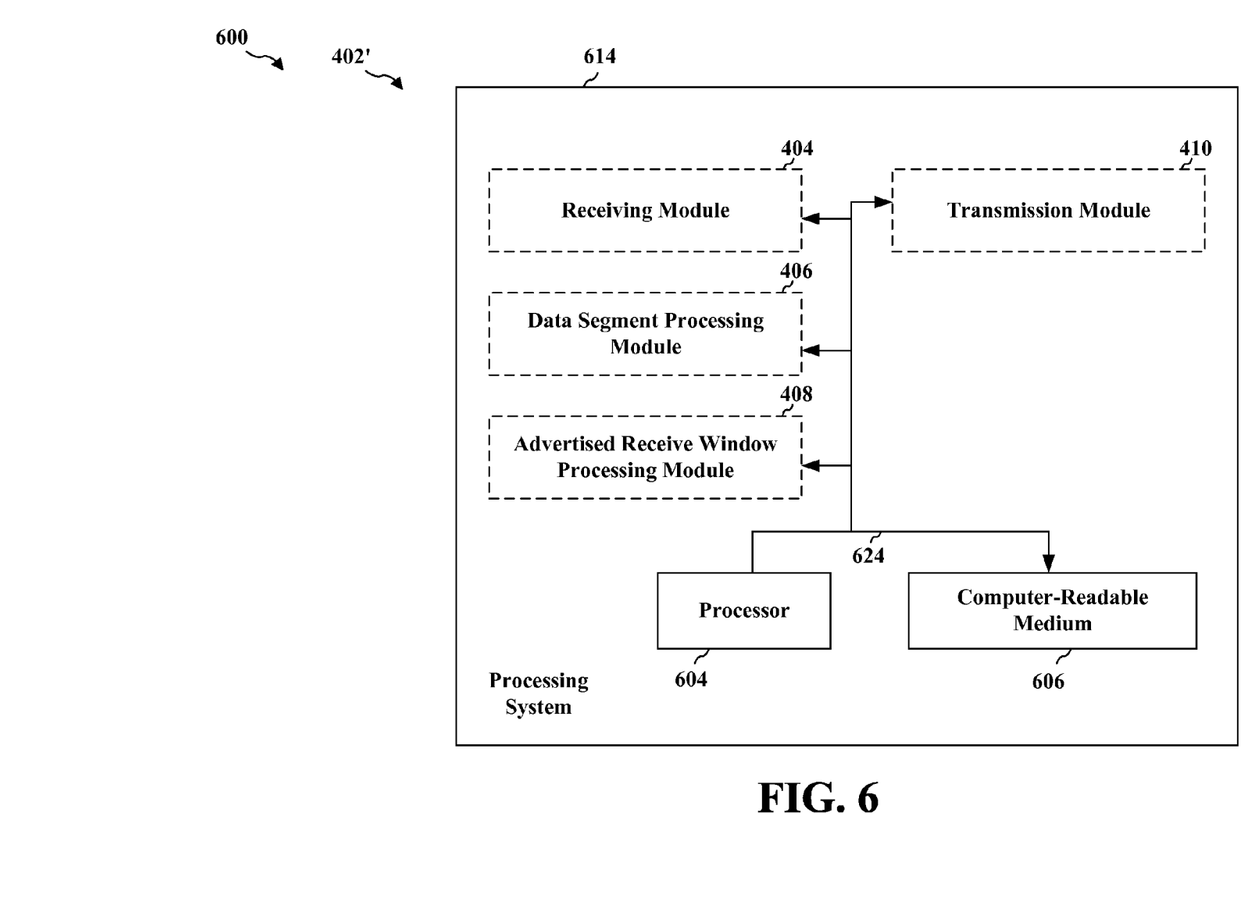
FIG. 6 is a diagram illustrating an example of a hardware implementation for an apparatus employing a processing system.

FIG. 6 is a diagram 600 illustrating an example of a hardware implementation for an apparatus 402' employing a processing system 614. The processing system 614 may be implemented with a bus architecture, represented generally by the bus 624. The bus 624 may include any number of interconnecting buses and bridges depending on the specific application of the processing system 614 and the overall design constraints. The bus 624 links together various circuits including one or more processors and/or hardware modules, represented by the processor 604, the modules 404, 406, 408, 410, and the computer-readable medium 606.

The processing system 614 includes a processor 604 coupled to a computer-readable medium 606. The processor 604 is responsible for general processing, including the execution of software stored on the computer-readable medium 606. The software, when executed by the processor 604, causes the processing system 614 to perform the various functions described supra for any particular apparatus. The computer-readable medium 606 may also be used for storing data that is manipulated by the processor 604 when executing software. The processing system further includes at least one of the modules 404, 406, 408, and 410. The modules may be software modules running in the processor 604, resident/stored in the computer readable medium 606, one or more hardware modules coupled to the processor 604, or some combination thereof.

In one configuration, the apparatus 402/402' for communicating data includes means for transmitting to a receiver a plurality of data segments according to a sequential order, means for receiving at a sender acknowledgment from the receiver acknowledging receipt of a highest sequence number of a data segment plus one received at the receiver, means for receiving an advertised receive window from the receiver, the advertised receive window indicating a buffer capacity for receiving data segments at the receiver, and means for sending at least one additional data segment to the receiver at an adjusted transmission rate based on the advertised receive window. The aforementioned means may be one or more of the aforementioned modules of the apparatus 402 and/or the processing system 614 of the apparatus 402' configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of communicating a plurality of data segments, the data segments corresponding to a sequential order, via the Transmission Control Protocol (TCP), the method comprising:
receiving from a sender a first data segment, the first data segment being one of the plurality of data segments;
sending to the sender an acknowledgement of the first data segment, the acknowledgement of the first data segment including a highest byte sequence number of the first data segment plus one;
receiving from the sender a second data segment, the second data segment being one of the plurality of data segments subsequent to the first data segment in the sequential order;
inferring at least one missing data segment between the first and second data segments; and
sending to the sender an acknowledgement of the second data segment that is sequentially after the at least one missing data segment based on the inference of the at least one missing data segment, the acknowledgement of the second data segment including the highest byte sequence number of the first data segment plus one.

2. The method of claim 1, wherein the acknowledgement of the second data segment is further based on knowledge of missing byte sequence numbers in the sequential order, the missing byte sequence numbers corresponding to the at least one missing data segment.

3. The method of claim 1, further comprising:
adjusting a receive window based on at least one of:
the inference of the at least one missing data segment, or
a round-trip-time of a TCP connection,
the receive window indicating a buffer capacity for receiving data segments; and
advertising the adjusted receive window to the sender.

4. The method of claim 3, further comprising receiving at least one additional data segment from the sender at an adjusted transmission rate based on the advertised adjusted receive window.

5. The method of claim 1, further comprising:
receiving from the sender the at least one missing data segment, wherein the at least one missing data segment is received after the receipt of the second data segment; and
sending to the sender an acknowledgement of the at least one missing data segment, the acknowledgement of the at least one missing data segment including a highest byte sequence number of the second data segment plus one.

6. The method of claim 1, wherein each of the plurality of data segments has a byte sequence number, and
the at least one missing data segment corresponds to at least one missing byte sequence number in the sequential order.

7. The method of claim 1, further comprising sending the contents of data segments received at any arbitrary time to an application without waiting to receive the at least one missing data segment.

8. A method of communicating a plurality of data segments, the data segments corresponding to a sequential order, via the Transmission Control Protocol (TCP), the method comprising:
transmitting to a receiver a first data segment, the first data segment being one of the plurality of data segments;
receiving from the receiver a first acknowledgement, the first acknowledgement including a highest sequence number of the first data segment plus one;
transmitting to the receiver a second data segment, the second data segment being the next data segment subsequent to the first data segment in the sequential order;
transmitting to the receiver a third data segment, the third data segment being one of the plurality of data segments subsequent to the second data segment in the sequential order;
receiving from the receiver a second acknowledgement after transmitting the third data segment;
inferring, based on the second acknowledgement, that the second data segment was not received by the receiver, wherein the second acknowledgement is received in response to the third data segment that is transmitted sequentially after the second data segment not received by the receiver, the second acknowledgement including the highest sequence number of the first data segment plus one; and
retransmitting the second data segment to the receiver.

9. The method of claim 8, further comprising:
receiving an advertised receive window from the receiver, the advertised receive window indicating a buffer capacity for receiving data segments at the receiver; and
sending at least one additional data segment to the receiver at an adjusted transmission rate based on the advertised receive window.

10. The method of claim 8, further comprising:
receiving from the receiver a third acknowledgement after retransmitting the second data segment, the third acknowledgement including the highest sequence number of the third data segment plus one; and
transmitting to the receiver a fourth data segment without retransmitting the third data segment, the fourth data segment being the next data segment subsequent to the third data segment in the sequential order.

11. An apparatus for communicating a plurality of data segments, the data segments corresponding to a sequential order, via the Transmission Control Protocol (TCP), the apparatus comprising:
means for receiving from a sender a first data segment, the first data segment being one of the plurality of data segments;
means for sending to the sender an acknowledgement of the first data segment, the acknowledgement of the first data segment including a highest byte sequence number of the first data segment plus one;
means for receiving from the sender a second data segment, the second data segment being one of the plurality of data segments subsequent to the first data segment in the sequential order;
means for inferring at least one missing data segment between the first and second data segments; and means for sending to the sender an acknowledgement of the second data segment that is sequentially after the at least one missing data segment based on the inference of the at least one missing data segment, the acknowledgement of the second data segment including the highest byte sequence number of the first data segment plus one.

12. The apparatus of claim 11, wherein the acknowledgement of the second data segment is further based on knowledge of missing byte sequence numbers in the sequential order, the missing byte sequence numbers corresponding to the at least one missing data segment.

13. The apparatus of claim 11, further comprising:
means for adjusting a receive window based on at least one of:
the inference of the at least one missing data segment, or
a round-trip-time of a TCP connection,
the receive window indicating a buffer capacity for receiving data segments; and
means for advertising the adjusted receive window to the sender.

14. The apparatus of claim 13, further comprising means for receiving at least one additional data segment from the sender at an adjusted transmission rate based on the advertised adjusted receive window.

15. The apparatus of claim 11, further comprising:
means for receiving from the sender the at least one missing data segment, wherein the at least one missing data segment is received after the receipt of the second data segment; and
means for sending to the sender an acknowledgement of the at least one missing data segment, the acknowledgement of the at least one missing data segment including a highest byte sequence number of the second data segment plus one.

16. The apparatus of claim 11, wherein each of the plurality of data segments has a byte sequence number, and
the at least one missing data segment corresponds to at least one missing byte sequence number in the sequential order.

17. The apparatus of claim 11, further comprising means for sending the contents of data segments received at any arbitrary time to an application without waiting to receive the at least one missing data segment.

18. An apparatus for communicating a plurality of data segments, the data segments corresponding to a sequential order, via the Transmission Control Protocol (TCP), the apparatus comprising:
means for transmitting to a receiver a first data segment, the first data segment being one of the plurality of data segments;
means for receiving from the receiver a first acknowledgement, the first acknowledgement including a highest sequence number of the first data segment plus one;
means for transmitting to the receiver a second data segment, the second data segment being the next data segment subsequent to the first data segment in the sequential order;
means for transmitting to the receiver a third data segment, the third data segment being one of the plurality of data segments subsequent to the second data segment in the sequential order;
means for receiving from the receiver a second acknowledgement after transmitting the third data segment;
means for inferring, based on the second acknowledgement, that the second data segment was not received by the receiver, wherein the second acknowledgement is received in response to the third data segment that is transmitted sequentially after the second data segment not received by the receiver, the second acknowledgement including the highest sequence number of the first data segment plus one; and
means for retransmitting the second data segment to the receiver.

19. The apparatus of claim 18, further comprising:
means for receiving an advertised receive window from the receiver, the advertised receive window indicating a buffer capacity for receiving data segments at the receiver; and
means for sending at least one additional data segment to the receiver at an adjusted transmission rate based on the advertised receive window.

20. The apparatus of claim 18, further comprising:
means for receiving from the receiver a third acknowledgement after retransmitting the second data segment, the third acknowledgement including the highest sequence number of the third data segment plus one; and
means for transmitting to the receiver a fourth data segment without retransmitting the third data segment, the fourth data segment being the next data segment subsequent to the third data segment in the sequential order.

21. An apparatus for communicating a plurality of data segments, the data segments corresponding to a sequential order, via the Transmission Control Protocol (TCP), the apparatus comprising:
a memory;
at least one processor coupled to the memory and configured to:
receive from a sender a first data segment, the first data segment being one of the plurality of data segments;
send to the sender an acknowledgement of the first data segment, the acknowledgement of the first data segment including a highest byte sequence number of the first data segment plus one;
receive from the sender a second data segment, the second data segment being one of the plurality of data segments subsequent to the first data segment in the sequential order;
infer at least one missing data segment between the first and second data segments; and
send to the sender an acknowledgement of the second data segment that is sequentially after the at least one missing data segment based on the inference of the at least one missing data segment, the acknowledgement of the second data segment including the highest byte sequence number of the first data segment plus one.

22. The apparatus of claim 21, wherein the acknowledgement of the second data segment is further based on knowledge of missing byte sequence numbers in the sequential order, the missing byte sequence numbers corresponding to the at least one missing data segment.

23. The apparatus of claim 21, the at least one processor further configured to:
adjust a receive window based on at least one of:
the inference of the at least one missing data segment, or
a round-trip-time of a TCP connection,
the receive window indicating a buffer capacity for receiving data segments; and
advertise the adjusted receive window to the sender.

24. The apparatus of claim 23, the at least one processor further configured to receive at least one additional data segment from the sender at an adjusted transmission rate based on the advertised adjusted receive window.

25. The apparatus of claim 21, the at least one processor further configured to:
receive from the sender the at least one missing data segment, wherein the at least one missing data segment is received after the receipt of the second data segment; and
send to the sender an acknowledgement of the at least one missing data segment, the acknowledgement of the at least one missing data segment including a highest byte sequence number of the second data segment plus one.

26. The apparatus of claim 21, wherein each of the plurality of data segments has a byte sequence number, and
the at least one missing data segment corresponds to at least one missing byte sequence number in the sequential order.

27. The apparatus of claim 21, the at least one processor further configured to send the contents of data segments received at any arbitrary time to an application without waiting to receive the at least one missing data segment.

28. An apparatus for communicating a plurality of data segments, the data segments corresponding to a sequential order, via the Transmission Control Protocol (TCP), the apparatus comprising:
a memory;
at least one processor coupled to the memory and configured to:
transmit to a receiver a first data segment, the first data segment being one of the plurality of data segments;
receive from the receiver a first acknowledgement, the first acknowledgement including a highest sequence number of the first data segment plus one;
transmit to the receiver a second data segment, the second data segment being the next data segment subsequent to the first data segment in the sequential order;
transmit to the receiver a third data segment, the third data segment being one of the plurality of data segments subsequent to the second data segment in the sequential order;
receive from the receiver a second acknowledgement after transmitting the third data segment;
infer, based on the second acknowledgement, that the second data segment was not received by the receiver, wherein the second acknowledgement is received in response to the third data segment that is transmitted sequentially after the second data segment not received by the receiver, the second acknowledgement including the highest sequence number of the first data segment plus one; and
retransmit the second data segment to the receiver.

29. The apparatus of claim 28, the at least one processor further configured to:
receive an advertised receive window from the receiver, the advertised receive window indicating a buffer capacity for receiving data segments at the receiver; and
send at least one additional data segment to the receiver at an adjusted transmission rate based on the advertised receive window.

30. The apparatus of claim 28, the at least one processor further configured to:
receive from the receiver a third acknowledgement after retransmitting the second data segment, the third acknowledgement including the highest sequence number of the third data segment plus one; and
transmit to the receiver a fourth data segment without retransmitting the third data segment, the fourth data segment being the next data segment subsequent to the third data segment in the sequential order.

31. A non-transitory computer-readable medium for communicating data a plurality of data segments, the data segments corresponding to a sequential order, via the Transmission Control Protocol (TCP), the non-transitory computer-readable medium comprising code for:
receiving from a sender a first data segment, the first data segment being one of the plurality of data segments;
sending to the sender an acknowledgement of the first data segment, the acknowledgement of the first data segment including a highest byte sequence number of the first data segment plus one;
receiving from the sender a second data segment, the second data segment being one of the plurality of data segments subsequent to the first data segment in the sequential order;
inferring at least one missing data segment between the first and second data segments; and
sending to the sender an acknowledgement of the second data segment that is sequentially after the at least one missing data segment based on the inference of the at least one missing data segment, the acknowledgement of the second data segment including the highest byte sequence number of the first data segment plus one.

32. A non-transitory computer-readable medium for communicating data a plurality of data segments, the data segments corresponding to a sequential order, via the Transmission Control Protocol (TCP), the non-transitory computer-readable medium comprising code for:
transmitting to a receiver a first data segment, the first data segment being one of the plurality of data segments;
receiving from the receiver a first acknowledgement, the first acknowledgement including a highest sequence number of the first data segment plus one;
transmitting to the receiver a second data segment, the second data segment being the next data segment subsequent to the first data segment in the sequential order;
transmitting to the receiver a third data segment, the third data segment being one of the plurality of data segments subsequent to the second data segment in the sequential order;
receiving from the receiver a second acknowledgement after transmitting the third data segment;
inferring, based on the second acknowledgement, that the second data segment was not received by the receiver, wherein the second acknowledgement is received in response to the third data segment that is transmitted sequentially after the second data segment not received by the receiver, the second acknowledgement including the highest sequence number of the first data segment plus one; and
retransmitting the second data segment to the receiver.

33. The non-transitory computer-readable medium of claim 32, further comprising code for:
receiving an advertised receive window from the receiver, the advertised receive window indicating a buffer capacity for receiving data segments at the receiver; and
sending at least one additional data segment to the receiver at an adjusted transmission rate based on the advertised receive window.

34. The non-transitory computer-readable medium of claim 32, further comprising code for:
- receiving from the receiver a third acknowledgement after retransmitting the second data segment, the third acknowledgement including the highest sequence number of the third data segment plus one; and
- transmitting to the receiver a fourth data segment without retransmitting the third data segment, the fourth data segment being the next data segment subsequent to the third data segment in the sequential order.

* * * * *